United States Patent
Miyashita et al.

(10) Patent No.: US 10,666,108 B2
(45) Date of Patent: May 26, 2020

(54) STATOR, METHOD FOR MANUFACTURING STATOR, AND MOTOR

(71) Applicant: SANYO DENKI CO., LTD., Tokyo (JP)

(72) Inventors: Toshihito Miyashita, Tokyo (JP); Masashi Suzuki, Tokyo (JP); Manabu Horiuchi, Tokyo (JP); Masaki Musha, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 238 days.

(21) Appl. No.: 15/829,411

(22) Filed: Dec. 1, 2017

(65) Prior Publication Data

US 2018/0102683 A1   Apr. 12, 2018

Related U.S. Application Data

(62) Division of application No. 14/619,538, filed on Feb. 11, 2015, now Pat. No. 10,312,763.

(30) Foreign Application Priority Data

Feb. 13, 2014  (JP) .................. 2014-025927
Nov. 28, 2014  (JP) .................. 2014-242214

(51) Int. Cl.
*H02K 3/18* (2006.01)
*H02K 3/32* (2006.01)
(Continued)

(52) U.S. Cl.
CPC ............. *H02K 3/325* (2013.01); *H02K 3/18* (2013.01); *H02K 3/30* (2013.01); *H02K 15/045* (2013.01); *H02K 15/12* (2013.01); *H02K 1/148* (2013.01)

(58) Field of Classification Search
CPC .......... H02K 1/146; H02K 3/18; H02K 15/12; H02K 15/045; H02K 15/0457; H02K 15/10; H02K 15/105
(Continued)

(56) References Cited

U.S. PATENT DOCUMENTS 2,607,816 A * 8/1952 Ryder .................. H02K 1/148
                                                 310/216.086
2,695,969 A   11/1954 Yates
(Continued)

FOREIGN PATENT DOCUMENTS

CN   1972077 A   5/2007
EP   2688183     1/2014
(Continued)

OTHER PUBLICATIONS

English machine translation, Kobayashi, JP 2004-032830 (Year: 2004).*

(Continued)

*Primary Examiner* — Burton S Mullins
(74) *Attorney, Agent, or Firm* — Rankin, Hill & Clark LLP (57) ABSTRACT

A stator includes: a stator core having an annular portion and a plurality of teeth that is radially protruded outward from an outer periphery of the annular portion; a molded coil that has an air-core portion into which the teeth of the stator core are inserted and that is stored in a slot formed between the teeth of the stator core; and a yoke that covers a circumference of the molded coil stored in the slot of the stator core. The molded coil has an arc-shaped cross-section, and the molded coil includes a resin-molded portion and an exposed portion exposed at the molded portion.

5 Claims, 9 Drawing Sheets

(51) Int. Cl.
*H02K 15/12* (2006.01)
*H02K 15/04* (2006.01)
*H02K 1/18* (2006.01)
*H02K 3/30* (2006.01)
*H02K 1/14* (2006.01)

(58) Field of Classification Search
USPC ........................................................ 310/208
See application file for complete search history.

(56) References Cited

U.S. PATENT DOCUMENTS

| | | | |
|---|---|---|---|
| 3,726,005 A | 4/1973 | Prostor | |
| 3,914,859 A * | 10/1975 | Pierson | H02K 1/16 29/596 |
| 5,083,052 A | 1/1992 | Ochi | |
| 5,722,152 A * | 3/1998 | Sumi | H02K 1/148 29/596 |
| 6,218,758 B1 * | 4/2001 | Miura | H02K 3/18 310/208 |
| 6,822,364 B2 | 11/2004 | Suzuki et al. | |
| 7,696,667 B2 | 4/2010 | Tatebe | |
| 7,898,143 B2 * | 3/2011 | Nonaka | H02K 5/08 310/215 |
| 8,063,547 B2 | 11/2011 | Makino et al. | |
| 8,823,240 B2 | 9/2014 | Yamagishi et al. | |
| 2003/0127933 A1 | 7/2003 | Enomoto et al. | |
| 2004/0010908 A1 | 1/2004 | Kobayashi | |
| 2004/0021393 A1 | 2/2004 | Suzuki et al. | |
| 2006/0232143 A1 * | 10/2006 | Purvines | H02K 1/148 310/43 |
| 2007/0114878 A1 | 5/2007 | Tatebe | |
| 2011/0127872 A1 | 6/2011 | Podack | |
| 2012/0025746 A1 | 2/2012 | Kawakubo et al. | |
| 2012/0062051 A1 | 3/2012 | Ueno et al. | |
| 2012/0146434 A1 | 6/2012 | Nonaka | |
| 2013/0009495 A1 | 1/2013 | Ueno et al. | |
| 2014/0210303 A1 | 7/2014 | Harada et al. | |
| 2015/0123509 A1 * | 5/2015 | Nonaka | H01F 27/022 310/208 |

FOREIGN PATENT DOCUMENTS

| | | | |
|---|---|---|---|
| JP | 393440 | 4/1991 | |
| JP | 2002-93654 | 3/2002 | |
| JP | 2004-032830 * | 1/2004 | H02K 3/34 |
| JP | 2004032830 A2 | 1/2004 | |
| JP | 2007195333 A2 | 8/2007 | |
| JP | 2009131052 A1 | 6/2009 | |
| JP | 2010136571 | 6/2010 | |
| JP | 4910089 B2 | 4/2012 | |
| WO | WO-2014030214 A1 * | 2/2014 | H02K 3/32 |

OTHER PUBLICATIONS

Office Action dated Feb. 24, 2018 for the corresponding Chinese Patent Application No. 201510042487.4.

* cited by examiner

STATOR, METHOD FOR MANUFACTURING STATOR, AND MOTOR

CROSS-REFERENCE TO RELATED APPLICATION

This application claims priority from Japanese Patent Application Nos. 2014-25927 filed on Feb. 13, 2014 and 2014-242214 filed on Nov. 28, 2014 with the Japan Patent Office, the entire content of which are hereby incorporated by reference.

BACKGROUND

1. Technical Field

The present disclosure relates to a stator for a motor, a method for manufacturing the stator, and a motor, with use of resin molded coils.

2. Description of the Related Art

There is a stator core with a slot-type outer shape. In the stator core with the slot-type outer shape, a plurality of teeth is radially protruded outward from the outer periphery of an annular portion. That is, the stator core has slots between the teeth on the outer side of the annular portion.

An air-core coil with a hollow air-core portion at the center is used for the stator core. The air-core coil is generally resin-molded is a resin molding die and formed as a molded coil.

The molded coil is stored in the slot. The air-core portion of the molded coil is inserted into each of the teeth protruded from the outer periphery of the annular portion of the stator core.

There has been disclosed a ring-shaped stator as a technique related to a stator with molded coils (see Japanese Patent No. 4910089). In the ring-shaped stator, the molded coils are resin-molded in resin molding dies, for example. The molded coils are trapezoidal in cross-section and have hollow portions. The molded coils are inserted into teeth protruded from the outer peripheral portion of the stator core and are fitted into a yoke. According to the technique disclosed in Japanese Patent No. 4910089, there is no need for insulating work to be performed on members other than the molded coils or providing an insulating structure, thereby reducing the manufacturing cost.

SUMMARY

A stator includes: a stator core having an annular portion and a plurality of teeth that is radially protruded outward from an outer periphery of the annular portion; a molded coil that has an air-core portion into which the teeth of the stator core are inserted and that is stored in a slot formed between the teeth of the stator core; and a yoke that covers a circumference of the molded coil stored in the slot of the stator core. The molded coil has an arc-shaped cross-section, and the molded coil includes a resin-molded portion and an exposed portion exposed at the molded portion.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the technique disclosed in Japanese Patent No. 4910089, in the case where the number of magnetic poles of the stator core is reduced to three or six, for example, when the trapezoidal molded coils are stored in the slots, dead spaces are produced in the slots. The dead spaces in the slots naturally lead to reduction in coil density, and thus reduction in motor efficiency.

An object of the present disclosure is to provide a stator that has a simple structure, improves coil density in slots, and enhances motor efficiency, a method for manufacturing the stator, and a motor including the stator.

A stator according to an embodiment of the present disclosure includes: a stator core having an annular portion and a plurality of teeth that is radially protruded outward from an outer periphery of the annular portion; a molded coil that has an air-core portion into which the teeth of the stator core are inserted and that is stored in a slot formed between the teeth of the stator core; and a yoke that covers a circumference of the molded coil stored in the slot of the stator core. The molded coil has an arc-shaped cross-section, and the molded coil includes a resin-molded portion and an exposed portion exposed at the molded portion.

In addition, a motor according to an embodiment of the present disclosure includes: the above-described stator; a shaft that is pivotally supported in the stator in a rotatable manner; and a rotor that is stored in the stator to be spaced from the stator and is fixed to a circumference of the shaft. The rotor has a rotor core and a plurality of permanent magnets that is arranged on a surface or inside of the rotor core.

Further, a method for manufacturing a stator according to an embodiment of the present disclosure includes: bending an air-core coil with art air-core portion to have an arc-shaped cross-section; forming a molded coil with the air-core portion by resin-molding the air-core coil such that lip portions thereof are exposed; inserting a plurality of teeth of a stator core with an annular portion and the teeth radially protruded outward from an outer periphery of the annular portion into the air-core portion of the molded coil to store the molded coil in a slot formed between the teeth of the stator core; and covering with a yoke the molded coil stored in the slot of the stator core.

According to the embodiment of the present disclosure, it is possible to provide a stator and a motor that have a simple structure and that allow increase of coil density in the slots by reducing dead spaces in the slots and enhancement of motor efficiency.

A stator, a method for manufacturing the stator, and a motor including the stator according to the embodiment will be described below with reference to the accompanying drawings.

In the stator, the method for manufacturing the stator, and the motor according to the embodiments, the air-core coil is formed in such a manner that its cross-section is arc-shaped (i.e., the air-core coil has an arc-shaped cross-section). In the arc-shaped air-core coil, the tip portion of a conductive pin is exposed. The entire air-core coil (except for the tip portion of the conductive pin) is resin-molded.

Therefore, according to the embodiment, it is possible to provide a stator that has a simple structure and that allows increase of coil density in slots by reducing dead spaces in the slots and enhancement of motor efficiency, and a motor including the stator.

[Configuration of Motor and Stator]

Figure 1:
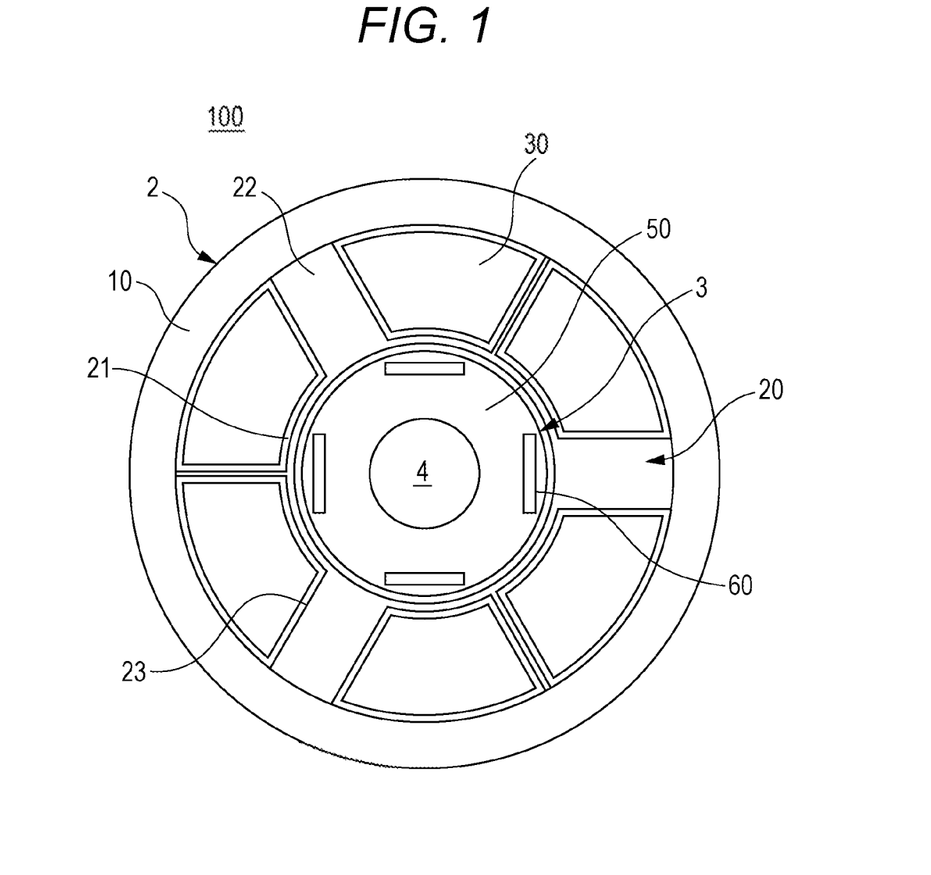
FIG. 1 is a schematic view of an entire configuration of a motor according to an embodiment.
Figure 2:
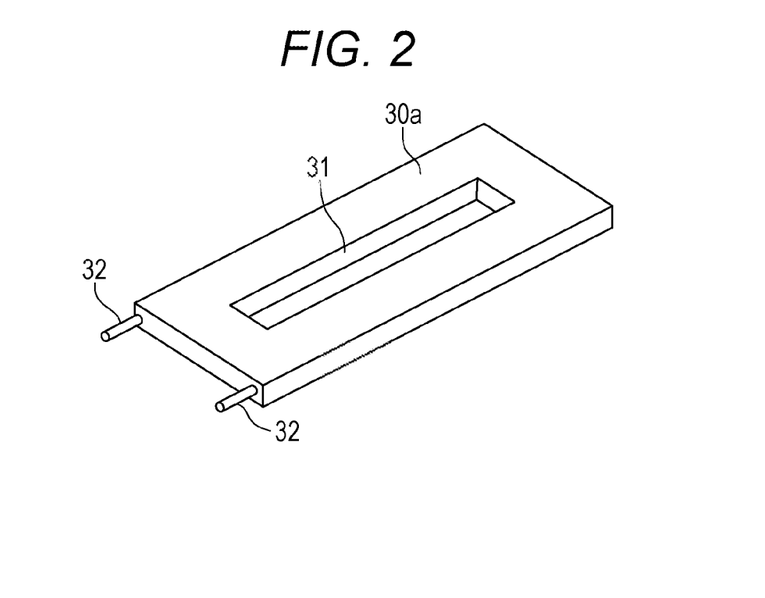
FIG. 2 is a perspective view of an air-core coil before molding according to the embodiment.
Figure 3:
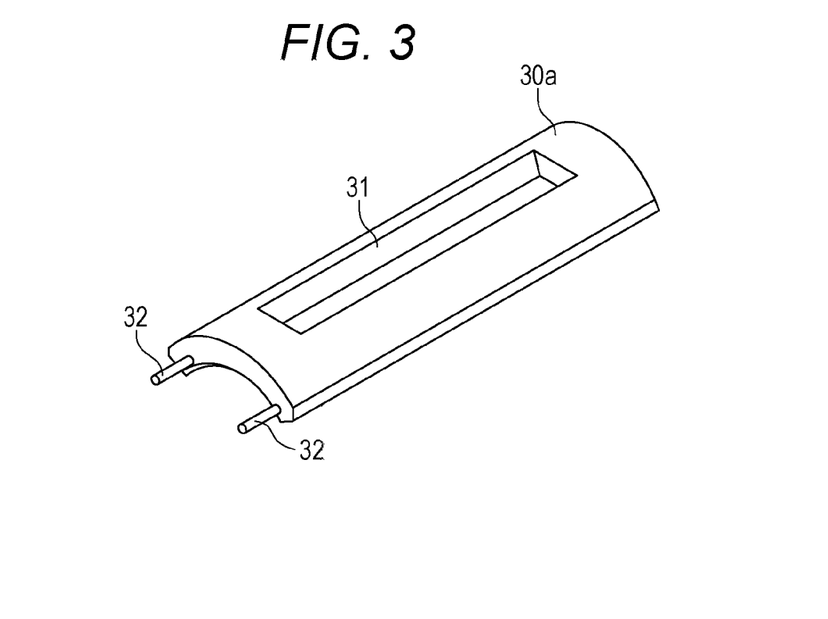
FIG. 3 is a perspective view of the air-core coil after molding according to the embodiment.
Figure 4:
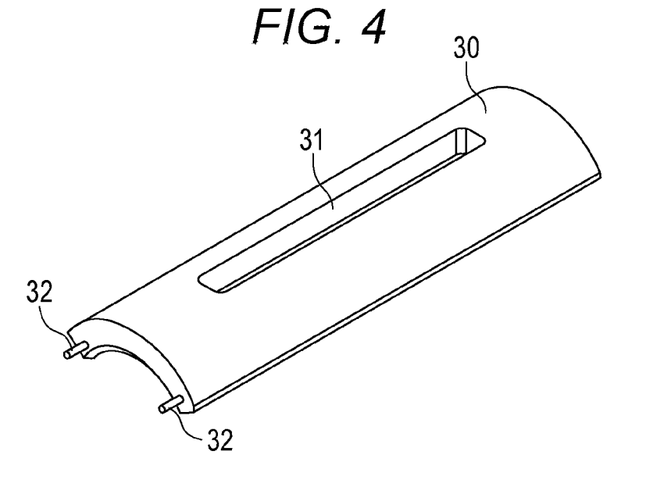
FIG. 4 is a perspective view of a molded coil according to the embodiment.
Figure 5:
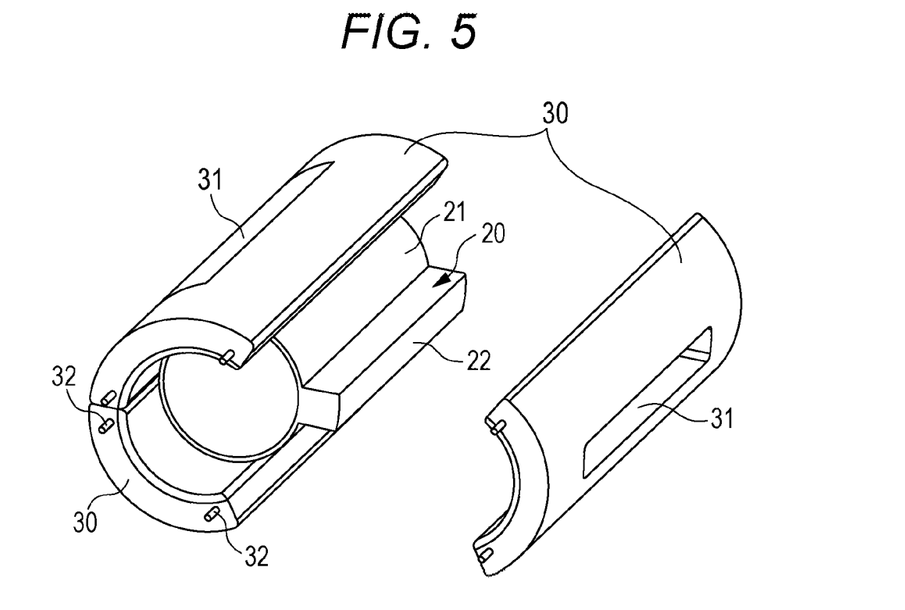
FIG. 5 is a perspective view illustrating a state in which the molded coils are attached to a stator core according to the embodiment.
Figure 6:
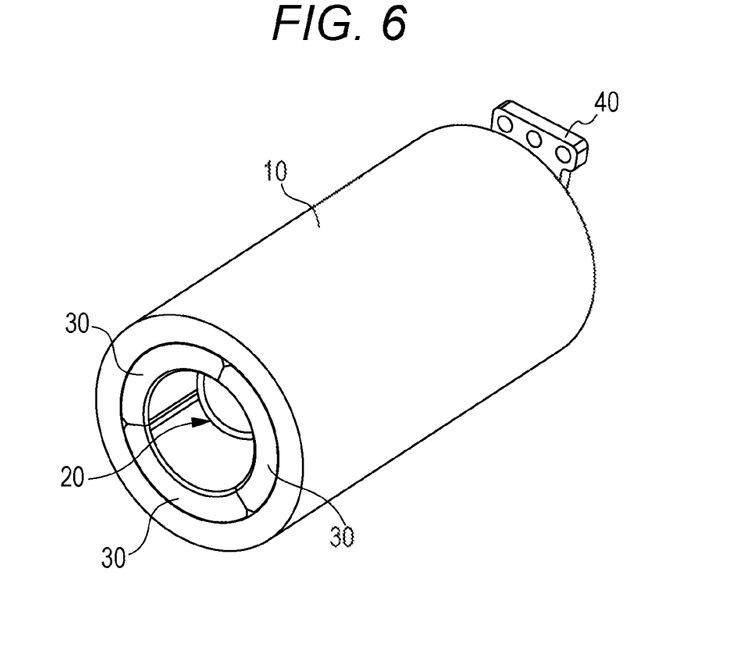
FIG. 6 is a perspective view of a stator according to the embodiment.
Figure 7:
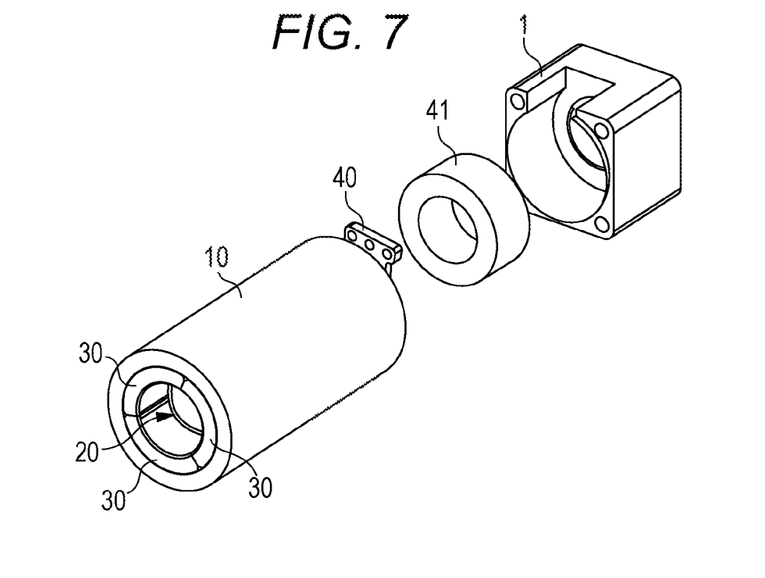
FIG. 7 is a perspective view of an attachment structure of the stator according to the embodiment.

First, a configuration of the motor according to the embodiment will be described with reference to FIGS. 1 to 7. FIG. 1 is a schematic view of an entire configuration of the motor according to the embodiment. FIG. 2 is a perspective view of an air-core coil before molding according to the embodiment. FIG. 3 is a perspective view of the air-core coil after molding according in the embodiment. FIG. 4 is a perspective view of a molded coil according to the embodiment. FIG. 5 a perspective view illustrating a state in which the molded coils are attached to a stator core. FIG. 6 is a perspective view of a stator according to the embodiment. FIG. 7 is a perspective view of an attachment structure of the stator according to the embodiment.

The motor according to the embodiment may be an AC servo motor, for example.

As illustrated in FIG. 1, a motor 100 includes a stator 2 and a rotor 3 in a bracket (not illustrated).

The bracket is composed of a load side bracket and a non-load side bracket. In the bracket, a columnar space is defined to accommodate the stator 2 and the rotor 3. The bracket has a through hole (not illustrated) at both ends for insertion of a shaft 4. The shaft 4 is pivotally supported in a rotatable manner in the stator 2, for example.

The material for the bracket may be a soft magnetic body such as a silicon steel plate or an aluminum alloy, for example. However, the material for the bracket is not limited thereto.

The stator 2 is fixed to the inner peripheral surface of the load side bracket. The stator 2 has a yoke 10, a stator core 20, and coils 30.

The yoke 10 is a cylindrical metallic member provided along the inner peripheral surface of the bracket. The yoke 10 surrounds the circumference of the coils 30 stored in the stator core 20. The yoke 10 has the function of closing a magnetic line of force and maximizing the action of electromagnetic induction. The yoke 10 also has the function of preventing or suppressing the impact on peripheral devices of the motor 100 by a magnetic field resulting from electromagnetic induction.

The material for the yoke 10 may be a soft magnetic body such as a silicon steel plate, for example. However, the material for the yoke 10 is not limited thereto.

The stator core 20 is a deformed cylinder-shaped magnetic member. The stator core 20 has an annular portion 21 and a plurality of teeth 22. The teeth 22 are radially protruded outward from the outer periphery of the annular portion 21 of the stator core 20. Slots 23 are defined and formed as spaces to accommodate the coils 30 between the teeth 22 and 22.

The material for the stator core 20 may be a soft magnetic body such as a silicon steel plate as in the case of the yoke 10, for example. However, the material for the stator core 20 is not limited thereto.

Each of the coils 30 of the embodiment is a resin-molded coil with an air-core portion 31 (see FIG. 2). The cross-section of the coil 30 is arc-shaped. The coil 30 of the embodiment is formed as described below.

First, as illustrated in FIG. 2, an air-core coil 30a is wound with use of a winding frame (not illustrated). The air-core coil 30a is shaped like a rectangular frame and has the hollow air-core portion 31 at the center. The electric wire of the air-core coil 30a is formed by a square wire with a rectangular cross-section. That is, the electric wire of the air-core coil 30a includes the square wire with a rectangular cross-section.

Conductive pins 32 and 32 are brazed to a winding start portion and a winding end portion of the air-core coil 30a (equivalent to a winding start and a winding end of the molded coil 30 (described later)). The shape of the conductive pin 32 is not limited to a circular column as in the embodiment. The shape of the conductive pin 32 may be any other shape such as a flat plats or a square column.

Next, as illustrated in FIG. 3, the air-core coil 30a is molded in molding die (not illustrated) in such a manner that its cross-section is arc-shaped. That is, the air-core coil 30a has an arc-shaped cross-section.

Further, the arc-shaped air-core coil 30a is fixed to an electrically-insulating bobbin (not illustrated). The bobbin is made of a synthetic resin, for example. However, the material for the bobbin is not limited thereto but may be any other material with electrical insulation properties. The arc-shaped air-core coil 30a feed to the bobbin is arranged in a resin molding die (not illustrated) while the tip portions of the conductive pins 32 and 32 are exposed. Then, the entire air-core coil 30a (except for the tip portions of the conductive pins 32 and 32) is molded of a synthetic resin (molding resin).

The molding resin may be an epoxy resin, for example. However, the molding resin is not limited thereto. The material for the bobbin and the material for the molding material may be the same or different from each other.

When the air-core coil 30a is resin-molded, the resin-molded coil (hereinafter simply referred to as a "molded coil") 30 is completed as illustrated in FIG. 4. The tip portions of the conductive pins 32 and 32 are exposed at one longitudinal end of the molded coil 30. That is, the air-core coil 30*a* is resin-molded in such a manner that its tip portions (for example, the tip portions of the conductive pins 32 and 32) are exposed. The molded coil 30, as the rosin-molded air-core coil 30*a*, includes a resin-molded portion (the entire the air-core coil 30*a* except for the tip portions of the conductive pins 32) and an exposed portion that is exposed at the molded portion (for example, the tip portions of the conductive pins 32).

As illustrated in FIG. 5, the molded coils 30 are stored in the slots 23 of the stator core 20 (see FIG. 1). At this time, the teeth 22 of the stator core 20 are inserted and arranged in the air-core portions 31 of the molded coils 30.

As illustrated in FIG. 6, the molded coils 30 stored on the stator core 20 are fitted into the yoke 10.

The number of the slots 23 and the number of the molded coils 30 correspond to each other. The illustrated stator 2 is configured to have three slots and three coils (see FIG. 1). However, the numbers of the slots 23 and molded coils 30 are not limited to the number described in this embodiment.

A circuit board 40 is disposed at one end of the stator 2. The circuit board 40 of the embodiment is provided by a printed wiring board. The circuit board 40 is brazed to the conductive pins 32 and 32 of the molded coils 30. The circuit board 40 is arranged between the load side bracket and the non-load side bracket.

The circuit board 40 is fixed to the conductive pins 32 and 32 by brazing. Therefore, there is a concern that the vibration of the motor 100 may separate the brazing material from the conductive pins 32, 32 and the circuit board 40.

Thus, as illustrated in FIG. 7, when the stator 2 is attached into a bracket 1, the circuit board 40 is preferably fixed by sandwiching an electrically-insulating elastic body 41 between the non-load side bracket 1 and the circuit board 40. That is, the stator 2 may include the electrically-insulating elastic body 41 for fixing the circuit board 40 to the bracket 1 between the circuit board 40 coupled to the ends of the resin-molded coils (air-core coils 30*a*) 30 and the bracket 1.

The material for the electrically-insulating elastic body 41 may be natural robber, silicon rubber, or urethane, for example. However, the material for the elastic body 41 is not limned thereto.

Returning to FIG. 1, the rotor 3 has a rotor core 50 and permanent magnets 60. The rotor 3 is stored in the stator 2 to be spaced from the stator 2 and is fixed to the circumference of the shaft 4. The shaft 4 is rotatably borne by a bearing supported at the both ends of the bracket 1. The shaft 4 constitutes the center of rotation of the rotor 5.

The rotor core 50 is a thick cylindrical metallic member provided on the circumference of the shaft 4. The rotor core 50 may be configured to include a rotor core stack with a plurality of laminated core sheets, or may be configured to include a single thick cylindrical metallic member, for example.

The material for the rotor core 50 may be a soft magnetic body such as a silicon steel plate, for example. However, the material for the rotor core 50 is not limited thereto.

A plurality of permanent magnets 60 is incorporated (arranged) in a surface or inside of the rotor core 50. The plurality of permanent magnets 60 is evenly or almost evenly arranged along the circumferential direction of the rotor core 50. The plurality of permanent magnets 60 is arranged such that N and S poles are alternately magnetized (placed) in the circumferential direction of the rotor core 50, for example. However, the magnetization arrangement of the permanent magnets 60 is not limited thereto.

The permanent magnets 60 may be rare-earth magnets such as neodymium magnets, for example. However, the material for the permanent magnets 60 is not limited thereto. In the embodiment, the air-core coils 30*a* are resin-molded such that the tip portions of the conductive pins are exposed. Alternatively, the air-core coil 30*a* may be resin-molded without joining (coupling) the conductive pins to the winding start portion and winding end portion of the air-core coil 30*a*. For example, the air-core coil 30*a* may be resin-molded such that its winding start portion and winding end portion are exposed.

<First Embodiment of Method for Manufacturing Stator in Subject Disclosure>

[Operations of Motor and Stator, and Method for Manufacturing Stator]

Figure 8:
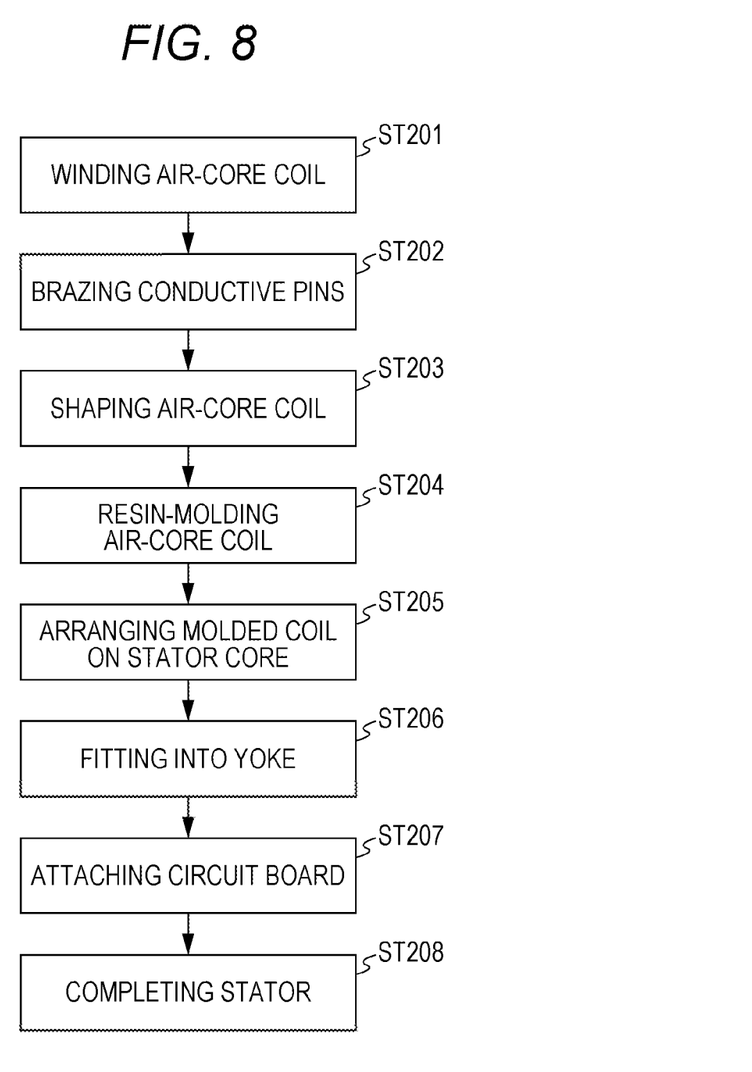
FIG. 8 is a diagram for describing a process for a method for manufacturing the stator according to a first embodiment.

Next, referring to FIGS. 1 to 8, a method for manufacturing the stator according to the embodiment will be described. FIG. 8 is a diagram for describing a process for the method for manufacturing the stator according to a first embodiment.

The method for manufacturing the stator according to the first embodiment includes at least the step of molding (for example, bending) the air-core coil and the step of resin-molding the shaped air-core coil to form the molded coil.

Referring to FIG. 8, the method for manufacturing the stator according to the first embodiment will be described below in detail.

First, the air-core coil 30*a* is wound (step (hereinafter abbreviated as "ST") 201). The air-core coil 30*a* is wound with use of a winding frame (not illustrated), for example. The air-core coil 30*a* is wound in the shape of a rectangular frame and has the hollow air-core portion 31 at the center (see FIG. 2). The electric wire of the air-core coil 30*a* (corresponding to the electric wire of the molded coil 30) is formed from a square wire with a rectangular cross-section.

Next, the conductive pins 32 and 32 are brazed (ST202). The conductive pins 32 and 32 are brazed to the winding start portion and winding end portion of the air-core coil 30*a*, respectively (see FIG. 2).

Then, the air-core coil 30*a* is shaped (ST203). Specifically, the air-core coil 30*a* is put into a molding die (not illustrated) and is bent such that the cross-section of the air-core coil 30*a* is arc-shaped (see FIG. 3). That is, the air-core coil 30*a* is shaped in such a manner that its cross-section is arc-shaped.

Next, the shaped air-core coil 30*a* is resin-molded (ST204). To perform the resins-molding, the arc-shaped air-core coil 30*a* is fixed to an electrically-insulating bobbin (not illustrated). Then, the air-core coil 30*a* with the arc-shaped cross-section fixed to the bobbin is put into a resin molding die. The entire air-core coil 30*a* (except for the tip portions of the conductive pins 32 and 32) is resin-molded while the tip portions of the conductive pins 32 and 32 soldered to the air-core coil 30*a* are exposed. That is, the air-core coil 30*a* is resin-molded such that the tip portions of the conductive pins 32 and 32 are exposed. The molding resin may be an epoxy resin, for example.

At ST204, the molded coil 30 with the arc-shaped cross-section is completed (see FIG. 4). The tip portions of the conductive pins 32 and 32 are exposed at the coil 30.

Next, the molded coils 30 are arranged on the stator core 20 (ST205). The stator core 20 has the plurality of teeth 22 protruded outward from the outer periphery of the annular portion 21. The teeth 22 of the stator core 20 are inserted into the air-core portions 31 of the molded coils 30 (see FIG. 3). Accordingly, the molded coils 30 are stored in the slots 23

(defined between the teeth 22 of the stator core 20) on the outer side of the annular portion 21 (see FIG. 1).

Then, the molded coils 30 arranged (stored) on the stator core 20 are fitted into the yoke 10 (the molded coils 30 arranged (stored) on the stator core 20 are covered with the yoke 10) (ST206).

Finally, the circuit board 40 are attached to the molded coils 30 (ST207). Specifically, while the circuit board 40 is placed on the molded coils 30, the circuit board 40 is brazed to the conductive pins 32 and 32.

After execution of the steps ST201 to ST207, the stator 2 is completed (ST208).

According to the method for manufacturing the stator according to the embodiment, the workability of stator assembly can be improved.

At ST207, the circuit board 40 is fixed by brazing to the conductive pins 32 and 32. Therefore, there is a concern that the vibration of the motor 100 may separate the brazing material from the conductive pins 32, 32 and the circuit hoard 40.

Thus, when the stator 2 is attached into the bracket 1, the circuit board 40 is preferably fixed by sandwiching the electrically-insulating elastic body 41 between the non-load side bracket 1b and the circuit board 40.

[Operations of Stator and Motor]

Next, referring to FIGS. 1 to 7, the operations of the stator and the motor according to the embodiment will be described.

As illustrated in FIGS. 1 and 7, the motor 100 according to the embodiment has the bracket 1, and the rotor 3 and the stator 2 arranged in the bracket 1.

In the rotor 3, the plurality of permanent magnets 60 is incorporated in the surface or inside of the rotor core 50. The plurality of the permanent magnets 60 is arranged such that the N and S poles are alternately magnetized in the circumferential direction.

Meanwhile, the stator 2 has the plurality of coils 30 that surrounds the rotor 3 and aligns in the circumferential direction.

That is, in the motor 100 according to the embodiment, an electric current flows into the coils 30 of the stator 2 to intersect the magnetic flux generated by the permanent magnets 60 on the rotor 3. In the motor 100 according to the embodiment, when the magnetic flux of the permanent magnets 60 and the electric current flowing into the coils 30 intersect each other, a circumferential driving force is generated in the coils 30 by the action of electromagnetic induction to rotate the rotor 3 around the shaft 4.

In the stator 2 and the motor 100 according to the embodiment, the air-core coil 30a is shaped such that its cross-section is arc-shaped. The tip portions of the conductive pins 32 and 32 are exposed at the arc-shaped air-core coil 30a, and the entire air-core coil 30a (except for the tip portions of the conductive pins 32 and 32) is resin-molded. By the resin-molding, the molded coil 30 including the conducive pins 32 and 32 with the tip portions exposed to the outside is completed.

The molded coils 30 are stored in the slots 23 on the outer side of the deformed stator core 20. That is, the stator core 20 has the plurality of teeth 22. The teeth 22 are radially protruded outward from the outer periphery of the annular portion 21. The spaces surrounded by the teeth 22 and 22 on the inner side of the yoke 10 constitute the slots 23.

The slots 23 are widely arc-shaped. Therefore, the arc-shaped molded coils 30 can be stored in the slots 23 with few gaps therebetween. Accordingly, dead spaces are not easily produced in the slots 23. According to the manufacturing method of the embodiment, the air-core coil 30a is resin-molded while the tip portions of the conductive pins are exposed. Alternatively, the air-core coil 30a may be resin-molded without soldering (coupling) the conductive pins to the winding start portion and winding end portion of the air-core coil 30a. For example, the air-core coil 30a may be resin-molded while the winding start portion and winding end portion of the air-core coil 30a are exposed. In this case, the exposed portion of the molded coil 30 is made up of the winding start portion and winding end portion of the air-core coil 30a (corresponding to the winding start portion and winding end portion of the molded coil 30).

<Second Embodiment of Method for Manufacturing Stator according in Subject Disclosure>

Figure 9:
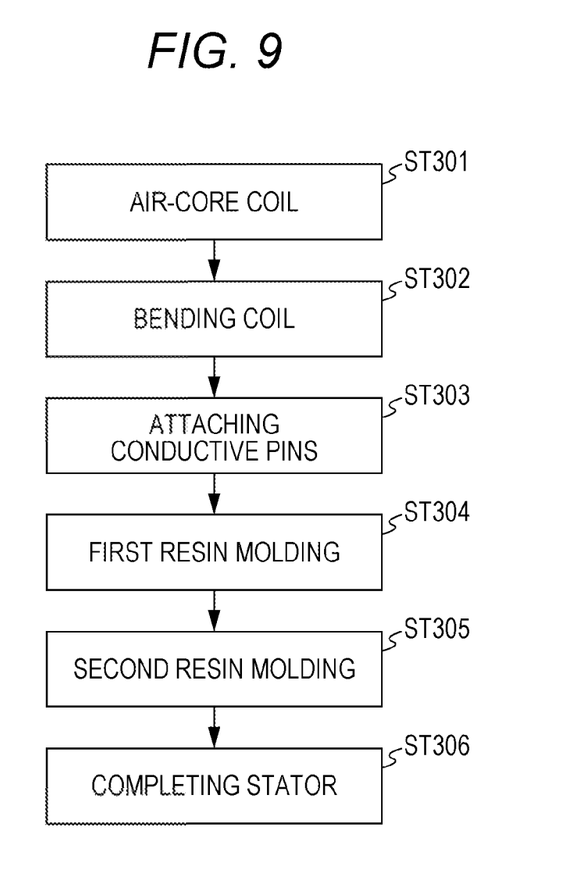
FIG. 9 is a diagram for describing a process for a method for manufacturing the stator according to a second embodiment.
Figure 10:
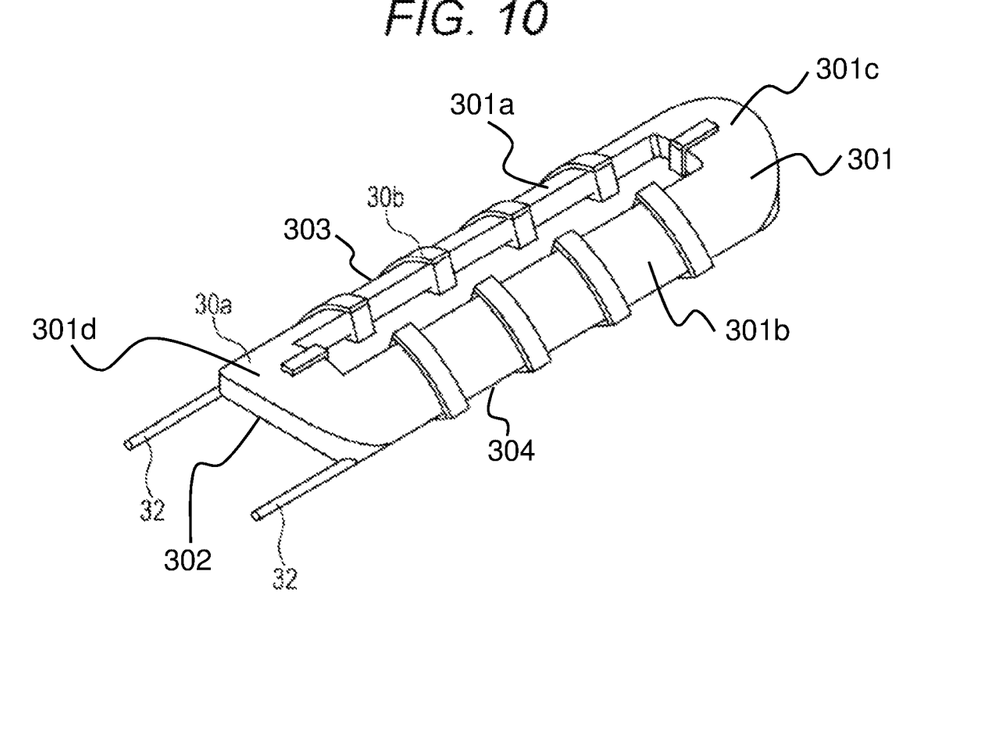
FIG. 10 is a perspective view of a coil after first resin molding in the stator according to the second embodiment.
Figure 11:
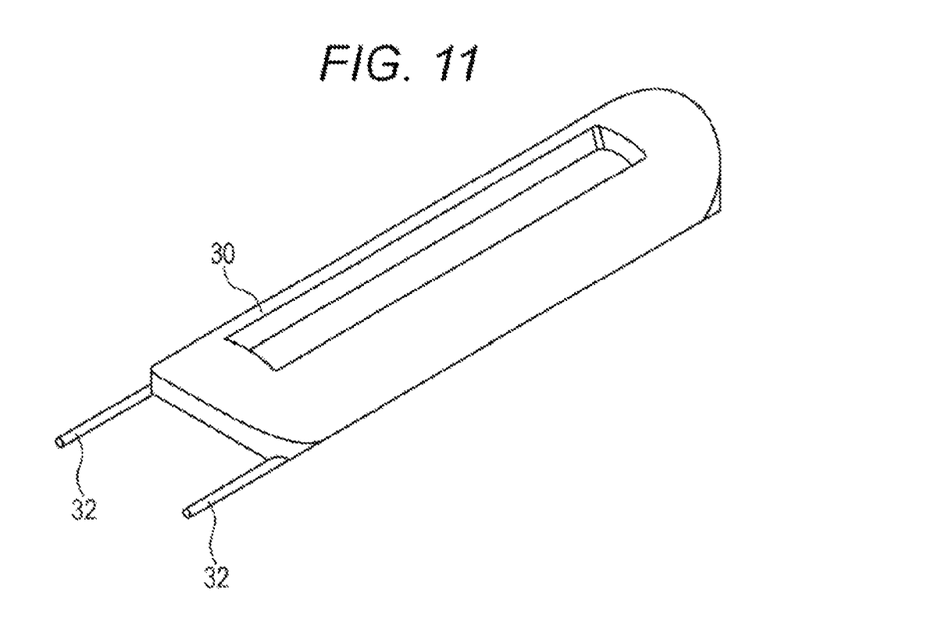
FIG. 11 is a perspective view of the coil after second resin molding in the stator according to the second embodiment.

Next, a method for manufacturing the stator according to the embodiment will be described, with reference to FIGS. 9 to 11. FIG. 9 is a diagram for describing a method for manufacturing the stator according to a second embodiment. FIG. 10 is a perspective view of a coil after first resin molding in the stator according to the second embodiment. FIG. 11 is a perspective view of the coil after second resin molding in the stator according to the second embodiment. FIGS. 2 to 5 will also be referred to as appropriate.

The air-core coil 30a is wound (ST301). The air-core coil 30a is wound with use of a winding frame (not illustrated), for example. The air-core coil 30a is wound in the shape of a rectangular frame and has the hollow air-core portion 31 at the center (see FIG. 2). The electric wire of the air-core coil 30a is formed from a square wire with a rectangular cross-section.

Then, the air-core coil 30a is bent (ST302). Specifically, the air-core coil 30a is put into a molding die (not illustrated) and is shaped such that the cross section of the air-core coil 30a is arc-shaped (see FIG. 3). That is, the air-core coil 30a is shaped to have an arc-shaped cross-section.

Next, the conductive pins 32 and 32 are brazed (ST303). The conductive pins 32 and 32 are brazed to the winding start portion and winding end portion of the air-core coil 30a, respectively. Accordingly, the tip portions of the conductive pins 32 and 32 of the arc-shaped air-core coil 30a are exposed. Instead of soldering the conductive pins to the winding start portion and winding end portion of the air-core coil 30a, the winding start portion and winding end portion of the air-core coil 30a may be exposed.

Then, the first resin molding is performed to resin-mold a portion of the shaped air-core coil 30a (ST304). The first resin molding is performed in such a manner that a portion of the resin-molded air-core coil 30a constitutes a reference plane 30b at the step of second resin molding as second-time resin molding (see FIG. 10). Referring to FIG. 10, the air core coil 30a has an arc-shaped cross-section which has an outer arc surface 301, an inner arc surface 302 and side surfaces 303, 304 connecting the outer arc surface 301 and the inner arc surface 302. The outer arc surface 301 includes a first portion 301a, a second portion 301b, a third portion 301c and a fourth portion 301d.

When the air-core coil 30a is set in a molding die for resin molding with reference to the insulating bobbin described above, the air-core coil 30a may not be pressed by the molding die and thus the air-core coil 30a may lift at ejection molding. This may bring about a molding failure, reduction in the yield of the molded coil 30, and deterioration in dimensional accuracy of the molded coil 30. In this case, by forming the reference plane 30b at the step of the first resin molding, it is possible to prepare the second resin molding. This leads to improvement in the yield and enhancement in the dimensional accuracy of the molded coil 30. At the step of the first resin molding, the air-core coil 30a is sandwiched and fixed in the resin molding die at a predetermined position, and then is resin-molded. That is, the first resin molding includes sandwiching and fixing the air-core coil 30a in the molding die at a predetermined position.

For resin molding at the step of tire first resin molding, a low-thermal conductivity resin with high fluidity may be used. It is found that a motor's principal heat source is a coil. To release heat from the coil as a heat source, the resin covering the coil is preferably a high-thermal conductivity resin. However, the high-thermal conductivity resin is generally difficult to handle due to its low fluidity. Thus, at the step of the first resin molding, the air-core coil 30a is molded with use of a low-thermal conductivity resin having high fluidity to facilitate production of the reference plane 30b for molding at the next step of the second resin formation.

Next, the second resin formation is performed to resin-mold the other portions of the air-core coil 30a with the reference plane 30b (ST305). At the step of the second resin formation as the second-time resin molding, the entire periphery of the air-core coil 30a including the other portions not molded at the first resin molding is covered with a resin for insulation (see FIG. 11).

For the resin molding at the step of the second resin molding, a high-thermal conductivity resin may be used. As described above, to enhance performance of heat release from the coil as the motor's principal heat source, molding can be performed with use of a high-thermal conductivity resin to efficiently release the heat. In the embodiment, first, at the first resin molding, a low thermal-conductivity resin with high fluidity is used to resin-mold the air-core coil 30a. Accordingly, the reference plane 30b is formed with high dimensional accuracy. Next, at the second resin molding, a high-thermal conductivity resin is used to resin-mold the other portions of the air-core coil 30a with the reference plane 30b. Accordingly, a coil-molded component with high dimensional accuracy and high heat release performance can be produced. In addition, at the second resin molding, the resin-molded portion of the air-core coil 30a (for example, the reference plane 30b) formed at the first resin molding step is sandwiched and thus the air-core coil 30a is feed in the resin molding die at a predetermined position. This enables resin molding with high dimensional accuracy. Specifically, the second resin molding includes sandwiching the portion of the air-core coil 30a resin-molded at the first resin molding and fixing the air-core coil 30a in the molding die at a predetermined position.

At ST305, the molded coil 30 with an arc-shaped cross-section is completed (see FIG. 11). The tip portions of the conductive pins 32 and 32 are exposed at the molded coil 30.

Next, the molded coils 30 are arranged on the stator core 20, and the teeth 22 of the stator core 20 are inserted into the air-core portions 31 of the molded coils 30 (see FIG. 5). Accordingly, the molded coils 30 are stored in the slots 23 on the outer side of the annular portion 21 (see FIG. 1). In addition, the molded coils 30 arranged on the stator core 20 are fitted into the yoke 10. Further, the circuit board 40 is attached to the moiled coils 30. Specifically, while the circuit board 40 is placed on the molded coils 30, the circuit board 40 is brazed to the conductive pins 32 and 32. Accordingly, the stator 2 is completed (ST306).

According to the method for manufacturing the stator of the embodiment, it is possible to improve the dimensional accuracy and the yield of the molded coils 30. In addition, when being incorporated into the motor, the stator 2 can release heat to the outside. Therefore, according to the embodiment, it is possible to provide the stator 2 with the properly of reducing temperature rise.

<Third Embodiment of Method for Manufacturing Stator in Subject Disclosure>

Figure 12:
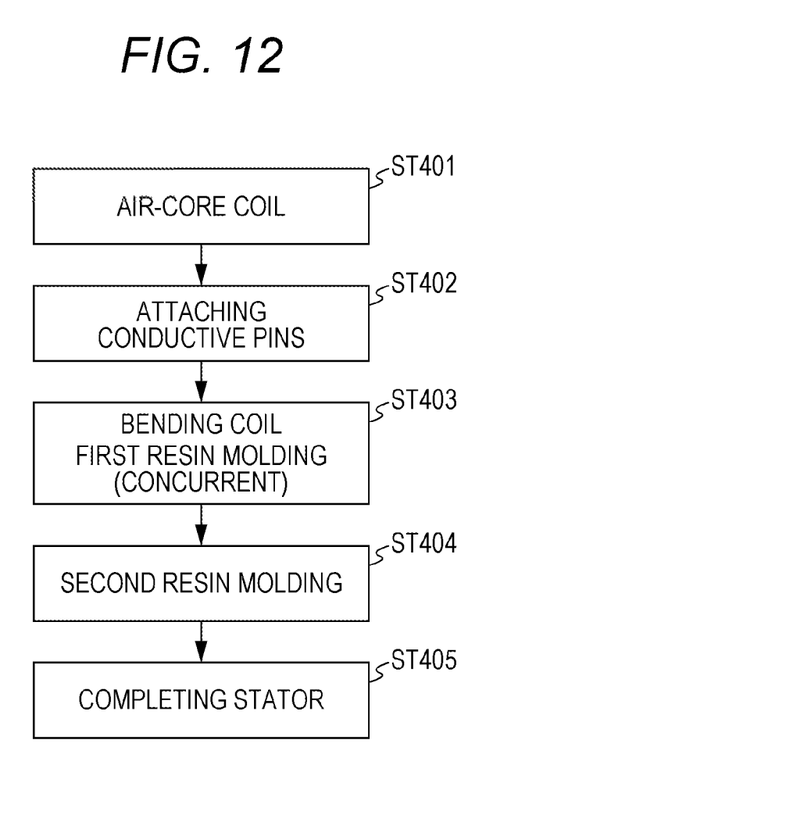
FIG. 12 is a diagram for describing a process for a method for manufacturing the stator according to a third embodiment.

A method for manufacturing the stator according to the embodiment will be described with reference to FIG. 12. FIG. 12 is a diagram for describing a process for a method for manufacturing the stator according to a third embodiment. FIGS. 2 to 5, 10, and 11 will also be referred to as appropriate.

The air-core coil 30a is wound (ST401). The air-core coil 30a is wound with use of a winding frame (not illustrated), for example. The air-core coil 30a is wound in the shape of a rectangular frame and has the hollow air-core portion 31 at the center (see FIG. 2). The electric wire of the air-core coil 30a is formed from a square wire with a rectangular cross-section.

Next, the conductive pins 32 and 32 are brazed (ST402). The conductive pins 32 and 32 are brazed to the winding start portion and winding end portion of the air-core coil 30a, respectively. Accordingly, the tip portions of the conductive pins 32 and 32 of the air-core coil 30a are exposed. Instead of soldering the conductive pins to the winding start portion and winding end portion of the air-core coil 30a, the winding start portion and winding end portion of the air-core coil 30a may be exposed.

Then, the first resin molding is performed (ST403). At the first resin molding, the air-core coil 30a is bent in such a manner that its cross-section is arc-shaped, and a portion of the air-core coil 30a is resin-molded. Specifically, the air-core coil 30a is put into a molding die (not illustrated) and is shaped such that its cross-section is arc-shaped (the air-core coil 30a has an arc-shaped cross-section), and at the same time, a portion of the air-core coil 30a is resin-molded.

At the first resin molding, a molding die capable of concurrently bending and resin-molding the air-core coil 30a (a molding die for concurrently bending and resin-molding the air-core coil 30a) may be used, for example. That is, the bending of the air-core coil 30a and the first resin molding may be performed with use of the same molding die.

The first resin molding is carried out in such a manner that a portion of the resin-molded air-core coil 30a constitutes the reference plane 30b at the second resin molding as the second-time resin molding (see FIG. 10). By forming the reference plane 30b at the step of the first resin molding, it is possible to prepare the second resin molding. This leads to improvement in the yield and enhancement in the dimensional accuracy of the molded coil 30. At the step of the first resin molding, the air-core coil 30a is sandwiched and fixed in the resin molding die at a predetermined position, and then is resin-molded. That is, the first resin molding includes sandwiching and fixing the air-core coil 30a in the molding die at a predetermined position.

For resin molding at the step of the first resin molding, a low-thermal conductivity resin with high fluidity may be used. It is found that a motor's principal heat source is a coil. To release heat from the coil as a heat source, the resin covering the coil is preferably a high-thermal conductivity resin. However, the high-thermal conductivity resin is generally difficult to handle due to its low fluidity. Thus, at the step of the first resin molding, the air-core coil 30a is molded with use of a low-thermal conductivity resin having high fluidity to facilitate production of the reference plane 30b for molding at the next step of the second resin formation.

Next, the second resin formation is performed to resin-mold the other portions of the air-core coil 30a with the reference plane 30*b* (ST404). At the step of the second resin formation as the second-time resin molding, the entire periphery of the air-core coil 30*a* is covered with a resin for insulation (see FIG. 11).

For the resin molding at the step of the second resin molding, a high-thermal conductivity resin may be used. As described above, to enhance performance of heat release from the coil as the motor's principal heat source, molding can be performed with use of a high-thermal conductivity resin to efficiently release the heat. In the embodiment, first, at the first resin molding, a low thermal-conductivity resin with high fluidity is used to resin-mold the air-core coil 30*a*. Accordingly, the reference plane 30*b* is formed with high dimensional accuracy. Next, at the second resin molding, a high-thermal conductivity resin is used to resin-mold the other portions of the air-core coil 30*a* with the reference plane 30*b*. Accordingly, a coil-molded component with high dimensional accuracy and high heat release performance can be produced. In addition, at the second resin molding, the resin-molded portion of the air-core coil 30*a* (for example, the reference plane 30*b*) formed at the first resin molding step is sandwiched and thus the air-core coil 30*a* is fixed in the resin molding die at a predetermined position. This enables resin molding with high dimensional accuracy. Specifically, the second resin molding includes sandwiching the portion of the air-core coil 30*a* resin-molded at the first resin molding and fixing the air-core coil 30*a* in the molding die at a predetermined position.

At ST404, the molded coil 30 with an arc-shaped cross-section is completed (see FIG. 11). The tip portions of the conductive pins 32 and 32 are exposed at the molded coil 30.

Next the molded coils 30 are arranged on the stator core 20, and the teeth 22 of the stator core 20 are inserted into the air-core portions 31 of the molded coils 30 (see FIG. 5). Accordingly, the molded coils 30 are stored in the slots 23 on the outer side of the annular portion 21 (see FIG. 1). In addition, the molded coils 30 arranged an the stator core 20 are fitted into the yoke 10. Further, the circuit board 40 is attached to the moiled coils 30. Specifically, while the circuit board 40 is placed on the molded coils 30, the circuit board 40 is brazed to the conductive pins 32 and 32. Accordingly, the stator 2 is completed (ST405).

According to the method for manufacturing the stator of the embodiment, it is possible to improve the dimensional accuracy and the yield of the molded coils 30. In addition, since a large portion of the stator 2 is molded of a high-thermal conductivity resin, the stator 2 can release heat to the outside when being incorporated into the motor. Therefore, according to the embodiment, it is possible to provide the stator 2 with the property of reducing temperature rise. Further, the manufacturing method in the embodiment has steps smaller in number by one as compared to the steps of the manufacturing method in the second embodiment. This reduces the manufacturing costs.

Figure 13:
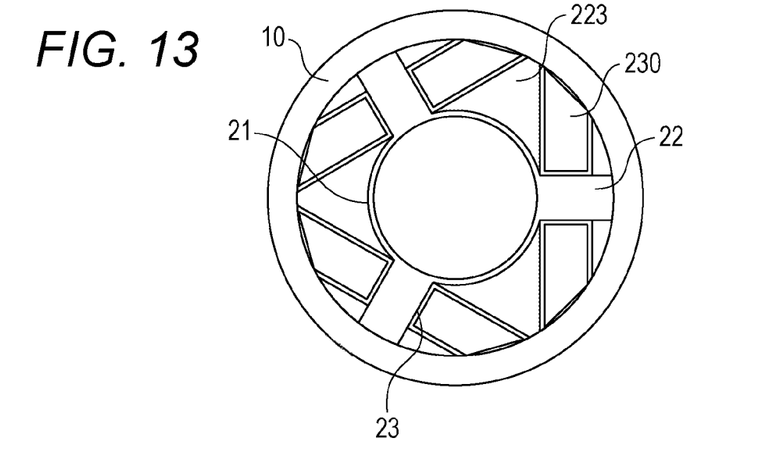
FIG. 13 is a schematic view of a conventional stator with three slots and three coils.
Figure 14:
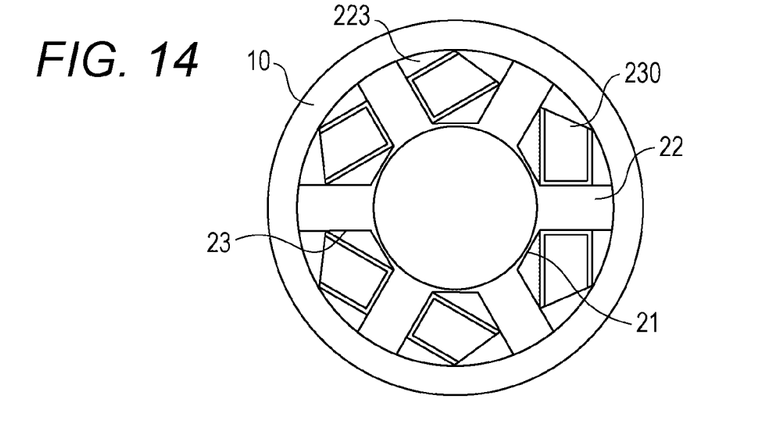
FIG. 14 is a schematic view of a conventional stator with six slots and three coils.
Figure 15:
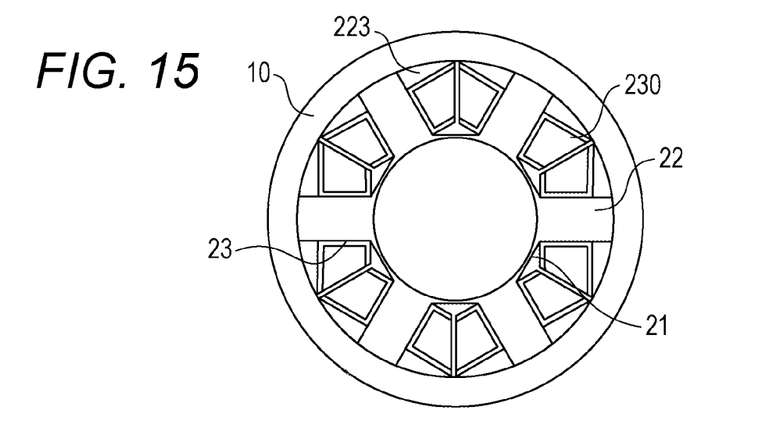
FIG. 15 is a schematic view of a conventional stator with six slots and six coils.

Next, conventional states illustrated in FIGS. 13 to 15 and the stator according to the embodiment will be compared with each other. FIG. 13 is a schematic view of a conventional stator with three slots and three coils. FIG. 14 is a schematic view of a conventional stator with six slots and three coils. FIG. 15 is a schematic view of a conventional stator with six slots and six coils. As illustrated in FIGS. 13 to 15, the conventional stator has trapezoidal molded coils 230. The other structural elements of the conventional stator are given the same reference numerals as those in FIG. 1.

Decreasing the number of coils in the motor leads to reduction in costs for wire winding and wire connection in the motor. For example, in the case of a three-phase motor, the number of coils is preferably a minimum of three or six.

However, when the molded coils 230 with trapezoidal cross-sections are used, dead spaces 223 incapable of accommodating the coils are produced in the slots 23 as illustrated in FIGS. 13 to 15. The dead spaces 223 decrease the coil density in the slots 23, and thus the motor efficiency is reduced.

In particular, as illustrated in FIG. 13, when three slots are used, the coil density is significantly deteriorated. Meanwhile, as illustrated in FIGS. 14 and 15, it is understood that, as the number of slots and the number of coils increase, the dead spaces 223 become smaller.

Thus, according to the stator 2 and the motor 100 in the embodiment, the molded coils 30 with widely arc-shaped cross-sections are stored in the widely arc-shaped slots 23. In addition, the yoke 10 is fitted onto the outer side of the molded coils 30 arranged on the stator core 20.

Therefore, according to the stator 2 and the motor 100 in the embodiment, the spaces in the slots 23 can be used most effectively with the simple structure. As a result, it is possible to provide the stator and the motor that improve the coil density and enhance the motor efficiency.

Further, the electric wires of the air-core coils 30*a* are formed by square wires with rectangular cross-sections. Accordingly, it is possible to reduce costs for wire winding and wire connection, and provide the motor of a small size at low cost.

A preferred embodiment of the present disclosure is described above. However, the foregoing description is intended only for illustration of the present disclosure, and is not intended to limit the technical scope of the present disclosure to the foregoing embodiment. The technique of the present disclosure can be carried out in various modes different from the foregoing embodiment without deviating from the gist of the present disclosure.

The molded coils 30 may be formed by resin molding such that only the top portions of the conductive pins 32 and 32 are exposed to the outside.

In addition, embodiments of the subject disclosure may be first to fifth stators, first motor, and first to fifth methods for manufacturing a stator as described below.

The first stator includes: a stator core having a plurality of teeth that is radially protruded outward from an outer periphery of an annular portion; an air-core coil that is stored in a slot formed between the teeth by inserting and arranging an air-core portion in the teeth of the stator core; and a yoke that covers a circumference of the air-core coil stored on the stator core, wherein the air-core coil is shaped in such a manner as to have an arc-shaped cross section, and the arc-shaped air-core coil is entirely resin-molded while a winding start portion and winding end portion of the air-core coil are exposed.

The second stator is configured such that, in the first stator, an electric wire of the air-core coil is formed by a square wire with a rectangular cross-section.

The third stator is configured such that, in the first or second stator, the air-core coil is a resin-molded coil that is formed by being fixed to an electrically-insulating bobbin to be resin-molded.

The fourth stator is configured such that, in the third stator, ends of the resin-molded coil are coupled to a circuit board, and the circuit board is fixed with an electrically-insulating elastic body sandwiched between a bracket and the circuit board.

The fifth stator includes: a stator core having a plurality of teeth that is radially protruded outward from an outer periphery of an annular portion; an air-core coil that is stored in a slot formed between the teeth by inserting and arranging an air-core portion in the teeth of the stator core; and a yoke that covers a circumference of the air-core coil stored on the stator core, wherein tire air-core coil is shaped to have an are-shaped cross-section, and the arc-shaped air-core coil is entirely resin-molded while tip portions of conducive pins coupled to the winding start portion and winding end portion of the air-core coil are exposed.

The first motor includes a rotor that is stored in any of the first to fifth stators to be spaced therefrom and is fixed to the circumference of a shaft pivotally supported at a bearing in a rotatable manner, wherein the rotor has a plurality of permanent magnets on the surface or inside of a rotor core.

The first method for manufacturing a stator is a method for manufacturing a stator including: a stator core having a plurality of teeth that is radially protruded outward from an outer periphery of an annular portion; an air-core coil that is stored in a slot formed between the teeth by inserting and arranging an air-core portion in the teeth of the stator core; and a yoke that covers a circumference of the air-core coil stored on the stator core, the method including at least the step of shaping the air-core coil to have an arc-shaped cross section and the step of resin-molding the entire arc-shaped air-core coil while tip portions of the air-core coil are exposed, wherein, in the step of resin-molding, the arc-shaped air-core coil is fixed to an electrically-insulating bobbin and then is stored in a resin molding die.

The second method for manufacturing the stator is a method for manufacturing a stator including: a stator core having a plurality of teeth that is radially protruded outward from an outer periphery of an annular portion; an air-core coil that is stored in a slot formed between the teeth by inserting and arranging an air-core portion in the teeth of the stator core; and a yoke that covers a circumference of the air-core coil stored on the stator core, the method including the step of shaping the air-core coil in such a manner as to have an arc-shaped cross section, the step of exposing tip portions of the arc-shaped air-core coil, the step of first resin molding for resin-molding a portion of the air-core coil, and the step of second resin molding for resin-molding the other portions of the air-core coil.

The third method for manufacturing the third stator is a method for manufacturing a stator including: a stator core having a plurality of teeth that is radially protruded outward from an outer periphery of an annular portion; an air-core coil that is stored in a slot formed between the teeth by inserting and arranging au air-core portion in the teeth of the stator core; and a yoke that covers a circumference of the air-core coil stored on the stator core, the method including the step of exposing tip portions of the air-core coil, the step of first resin molding for shaping the air-core coil in such a manner as to have an arc-shaped cross section and resin-molding a portion of the air-core coil, and the step of second resin molding for resin-molding the other portions of the air-core coil.

The fourth method for manufacturing the stator is configured such that, in the second or third method for manufacturing the stator, the air-core coil is sandwiched and fixed in a resin molding die at a predetermined position in the step of first resin molding, and the portion of the air-core coil resin-molded in the step of first resin molding is sandwiched and feed in the resin molding die at a predetermined position in the step of second resin molding.

The fifth method for manufacturing the stator is configured such that, in the any of the second to fourth methods for manufacturing the stator, the air-core coil is molded by a low-thermal conductivity resin having high fluidity in the step of first resin molding, and the air-core coil is molded by a high-thermal conductivity resin in the step of second resin molding.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for manufacturing a stator, comprising:
    bending an air-core coil with an air-core portion to have an arc-shaped cross-section;
    forming a molded coil with the air-core portion by resin-molding the air-core coil such that tip portions thereof are exposed;
    inserting a plurality of teeth of a stator core with an annular portion having a cylindrical shape and the teeth radially protruded outward from an outer periphery of the annular portion into the air-core portion of the molded coil to store the molded coil in a slot formed between the teeth of the stator core; and
    covering with a yoke the molded coil stored in the slot of the stator core, wherein resin-molding the air-core coil includes:
    exposing the tip portions of the arc-shaped air-core coil;
    first resin molding a portion of the air-core coil with a first resin; and
    second resin molding other portions of the air-core coil,
    wherein the arc-shaped cross-section of the air core coil has an outer arc surface, an inner arc surface and side surfaces connecting the outer arc surface and the inner arc surface,
    the outer arc surface includes first to fourth portions surrounding the air-core portion, the first and second portions being longer than the third and fourth portions, the first and second portions extending in a direction of an axis of the cylindrical shape of the annular portion, and
    in the first resin molding, the first resin covers a part of the first portion or the second portion of the outer arc surface and the first resin extends from the air-core portion to one of the side surfaces.

2. The method for manufacturing the stator according to claim 1, wherein
    the first resin molding is carried out such that the portion of the air-core coil serves as a reference surface in the second resin molding.

3. The method for manufacturing the stator according to claim 1, wherein the bending of the air-core coil and the first resin molding are carried out using a same molding die.

4. The method for manufacturing the stator according to claim 1, wherein
    the first resin molding includes sandwiching and fixing the air-core coil in the molding die at a predetermined position, and
    the second resin molding includes sandwiching the portion of the air-core coil resin-molded in the first resin molding and fixing the air-core coil in the molding die at a predetermined position.

5. The method for manufacturing the stator according to claim 1, wherein a low-thermal conductivity resin having high fluidity is used for the first resin molding and a high-thermal conductivity resin is used for the second resin molding.

\* \* \* \* \*